May 8, 1923.
S. C. B. BROWN
1,454,036
RESILIENT TIRE CONSTRUCTION
Filed July 2, 1919   2 Sheets-Sheet 1
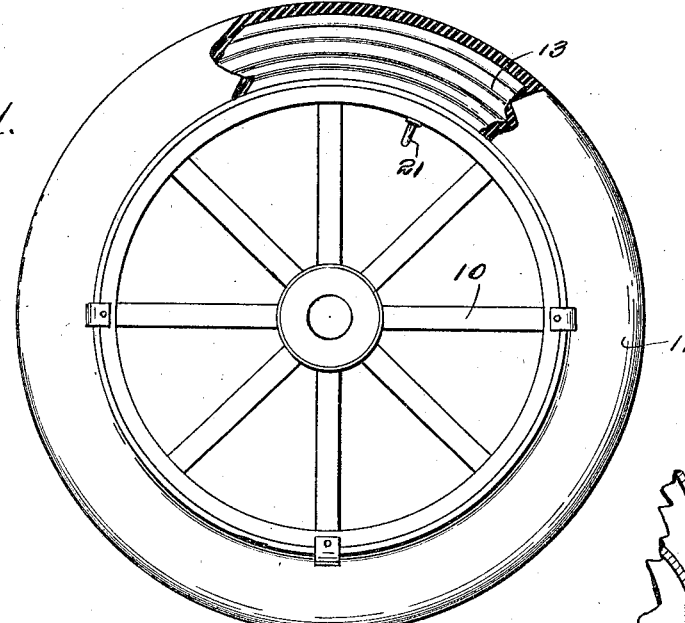
Fig.1.
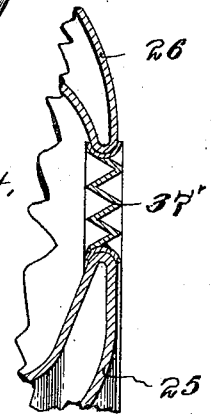
Fig.4.
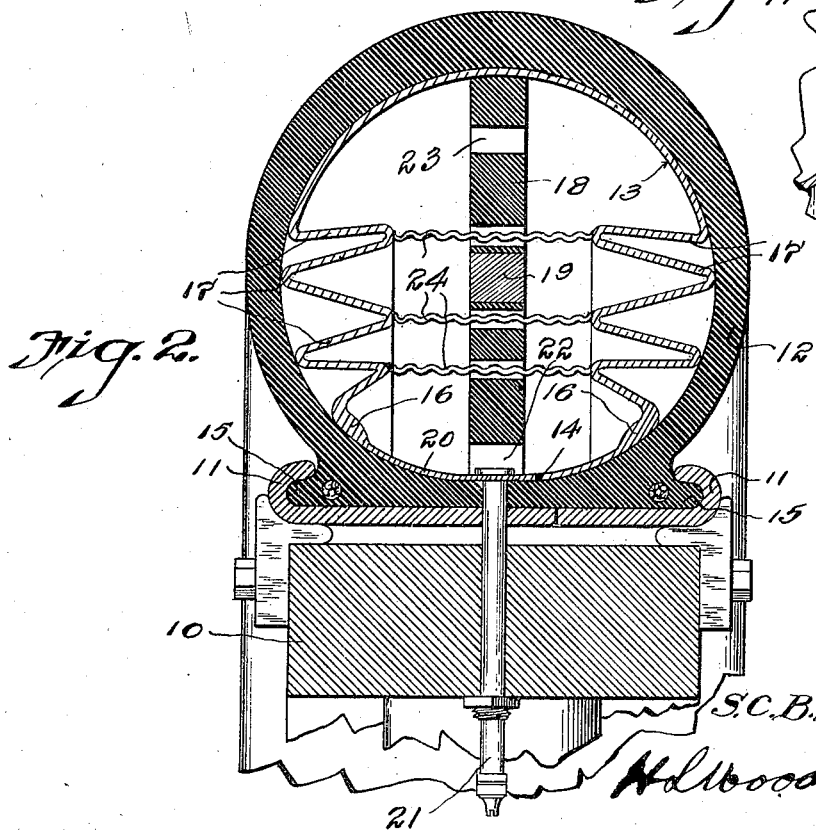
Fig.2.
Inventor
S.C.B.Brown,
Attorney May 8, 1923.
S. C. B. BROWN
1,454,036
RESILIENT TIRE CONSTRUCTION
Filed July 2, 1919
2 Sheets-Sheet 2
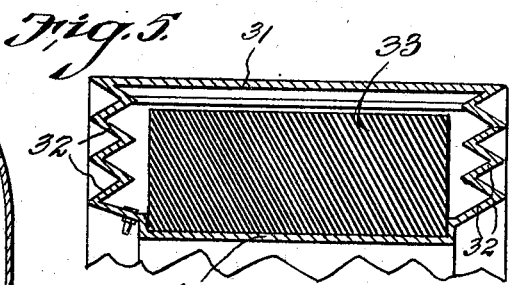
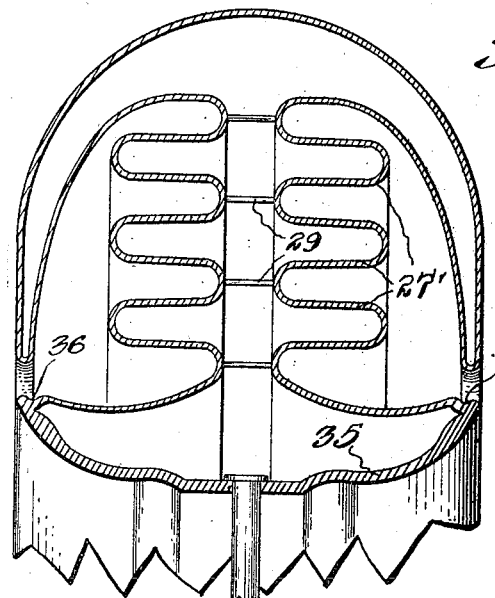
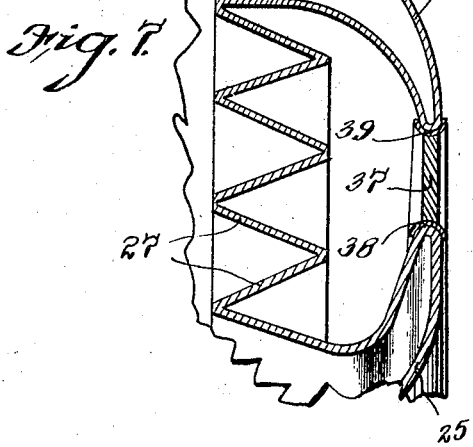
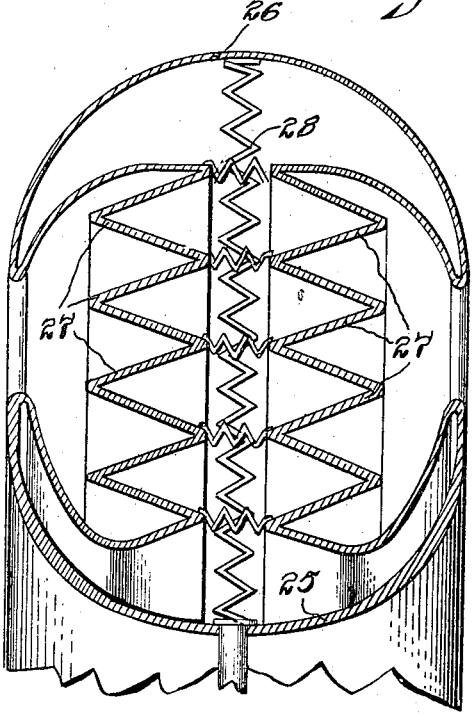
Inventor
S. C. B. Brown,
By H. Woodward
Attorney Patented May 8, 1923.

1,454,036

UNITED STATES PATENT OFFICE.

SAMUEL C. B. BROWN, OF AMITE, LOUISIANA.

RESILIENT TIRE CONSTRUCTION.

Application filed July 2, 1919. Serial No. 308,109.

*To all whom it may concern:*

Be it known that I, SAMUEL C. B. BROWN, a citizen of the United States, residing at Amite city, in the parish of Tangipahoa and State of Louisiana, have invented certain new and useful Improvements in Resilient Tire Constructions, of which the following is a specification.

The invention has for an object to provide a satisfactory substitute for rubber inner tubes for motor vehicle tires, and aims to enable the production of such a substitute from metal, in a manner to permit the introduction of the substitute device into the ordinary pneumatic shoe as now constructed for use with rubber tubes.

It is also an aim to give an appliance of this character which is adapted to be used independently of such shoes when desired. A further aim is to present a construction of this character which will have special advantages for use in ordinary shoes for pneumatic tires.

Additional objects, advantages and features of invention will appear from the construction, arrangement and combination of parts hereinafter set forth and shown in the drawings, wherein, Fig. 1 is a side elevation of a motor wheel, equipped with my invention, a portion being broken away to show interior parts, Fig. 2 is a cross sectional view of the felly and tire, enlarged, Fig. 3 is a cross sectional view of a modified construction of inner elements, Fig. 4 is a fragmentary cross sectional view of a further modified form of inner element, Fig. 5 is an illustration of a construction suitable for use upon truck wheels, Fig. 6 is a cross sectional view of a further modification of inner element for use with pneumatic tire shoes.

Fig. 7 is a fragmentary cross sectional view of a modification of my device.

There is illustrated in Figures 1 and 2, a wheel 10 of ordinary construction including the clincher rim 11 upon which there is mounted a tire shoe 12 of usual form, the parts mentioned being already available upon the market in various satisfactory forms. Within the shoe 12 there is engaged a pneumatic element 13, which may be formed integrally from sheet metal by spinning or other operations, a joint being formed at the inner side at 14 as indicated, the pneumatic element being initially formed with the edge portions 14 separated some distance, enabling the more ready formation of the parts as will be described, these separated edge portions being finally pressed together and welded. The line of weld is located in a portion of the device which will be subject in a minimum degree to flexures, so that the liability of fracture there is minimized. Preferably also, the portions of the device extending for a short distance beyond the bead 15 of the shoe are thickened, as indicated at 16. The sides of the pneumatic element 13 have bellows-like side portions which in cross section have a serpentine form as shown at 17, while securely vulcanized to the inner side of the pneumatic element there is a cushion check device 18, in the medial plane of the tire which may be formed of rubber, having a hard core 19, of rubber or other suitable material, such as wood, its inner edge being spaced a distance from the inner surface of the pneumatic element as at 22. The check device 18 may be continuous, and is so shown. Openings 23 may be formed through the check device as desired.

Secured to the inner angles of the inwardly projected portions of the tire. (which may be accomplished by welding) there are small transverse corrugated strips of metal 24 extending through suitable apertures in the check device. The strips 24 need not be corrugated, and it may be found preferable to use a small chain or a plain piece of wire.

The bellows portions 17 terminate a short distance outwardly of the center of the space within the pneumatic element, from which point it is formed in a curve conforming to that proper for the shoe within which it is to be engaged. The base portion 20 is also similarly formed, so as to rest snugly within the lower part of the shoe. An air valve 21 is engaged in the pneumatic element at one point, arranged to project through the felly in the customary manner as shown in Fig. 2.

By the construction of the device as thus described, when engaged within a shoe and in use, the convoluted side portions of the pneumatic element will, by their great extent and by the employment of extremely thin sheet metal, accommodate ordinary inequalities of road surfaces, but should a large stone be encountered, or should the tire become partly or completely deflated, or under any other circumstance which would tend to permit the complete collapse of the device, the inner portion of the cushion element 18 will engage against the inner side of the pneumatic element supporting it so that the pneumatic element will not be completely collapsed by a moderate load nor the bellows portion 17 excessively bent together so as to involve liability of its fracture. Further, in the ordinary operation of the device, the thickened portion 16 will so support the load, that the side walls of the shoe 12 will not be borne inwardly against the clincher flanges of the rim 11 whereby liability of rim cutting is obviated.

In Figure 3 there is shown a modification of the pneumatic element in which the equivalent of the bellows element 17 before mentioned is provided within the central part of the device where the bellows part may not rest upon the shoe. In this instance the device is of similar form both at the inner and outer sides, with the exception that the inner side is thickened in the vicinity of the line at which the clincher rim will be located. The inner and outer parts include semi-circular portions 25 and 26, the side portions of which are abruptly recurved and extended inwardly on a curve similar to that of but slightly divergent from the adjacent outer side and have bellows portions 27 formed integrally with the last mentioned inwardly curved parts extending across the space between the two. A connecting metal strip 28 of zig-zag form is also extended between these bellows and connected to the inner and outer parts 25 and 26 before mentioned, whereby the parts are held against excessive extension or separation, and also against excessive compression by reason of the fact that the edge terminations of the curved parts 25 and 26 will come into engagement and take the load under excessive compression.

In Fig. 5 there is illustrated a construction suitable for use in motor trucks, in this instance the pneumatic element being also intended to engage directly against the road surface, including cylindrical inner and outer portions 30 and 31 having a normal predetermined spacing, integral bellows portions 32 being extended between their edges at respective sides. Between the portions 30 and 31 there is interposed a block of rubber or other cushioning material 33 normally having no load carrying function, the outer part being spaced from the portion 31 so that the latter is free to yield to a certain extent under inequalities of road surfaces encountered, but the cushion element will engage and support the portion 31 under excessive loads, compression or local yielding of the parts to an excessive degree.

In Fig. 6 there is illustrated a form of device somewhat similar to that shown in Fig. 3, with the exception that the inner part 35 extends only a slight distance above the general location of the rim, a groove 36 being formed at its terminal part on each side extending entirely around the device, while the outer portion is formed in a manner somewhat similar to that shown in Fig. 3, except that the side parts are extended inwardly a greater distance so as to lie spaced from the grooves 36 a short distance so as to permit relative play of the inner and outer parts within proper limits, bellows portions 27' being extended between the inner and outer parts in the same manner as shown and described in connection with the modification shown in Fig. 3. The bellows portions are also connected by small strips of metal 29, or they may be formed as shown at 24 in Fig. 2, by which they are held within a predetermined range of lateral movement relatively to each other.

In Fig. 7 there is shown a further form of my invention, adapted to be used without the usual shoe, the parts being formed similarly to those shown in Fig. 3, and before described, but in addition I have provided a closure device 37 mounted between two terminal edges of the upper and lower sections of the tire. The closure device 37 is secured between two channelled rings 38 and 39, the last mentioned rings being adapted to fit around the terminal edge portions of the upper and lower sections of the tire. The plates 38 and 39 may be permanently secured to the tire, in any suitable manner. The closure element 37 may be formed of rubber or rubberized fabric, though other materials may be employed, as, for instance, a bellows 37' of sheet metal, as in Fig. 4.

What is claimed:

In a tire, a pneumatic element including a tread part and a rim part, and a planiform annular cushion element medially and concentrically mounted on one part to co-engage between the two first named parts at times, being of a radial dimension less than the distance between the tread and rim parts, whereby the cushion will prevent excessive depression of the pneumatic element, but will be inoperative normally.

In testimony whereof I have affixed my signature in presence of two witnesses.

SAMUEL C. B. BROWN.

Witnesses:
 GERALD E. PECK,
 H. T. LONG.